United States Patent
Luo et al.

(10) Patent No.: US 12,188,809 B2
(45) Date of Patent: Jan. 7, 2025

(54) ADJUSTING PARAMETERS OF WEIGHING DEVICE FOR REDUCING AVERAGE GIVEAWAY RATE WHEN PACKAGING AN ARTICLE

(71) Applicant: International Business Machines Corporation, Armonk, NY (US)

(72) Inventors: Deng Xin Luo, Xian (CN); Xiang Yu Yang, Xi'an (CN); Yong Wang, Xi'an (CN); Ye Wang, Xian (CN); Zhong Fang Yuan, Xi'an (CN); Yu Pan, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 301 days.

(21) Appl. No.: 17/350,699

(22) Filed: Jun. 17, 2021

(65) Prior Publication Data

US 2022/0404193 A1   Dec. 22, 2022

(51) Int. Cl.
| | | |
|---|---|---|
| G01G 19/414 | (2006.01) | |
| G01G 19/417 | (2006.01) | |
| G01G 19/52 | (2006.01) | |
| G01G 19/62 | (2006.01) | |

(Continued)

(52) U.S. Cl.
CPC ....... *G01G 19/4144* (2013.01); *G01G 19/417* (2013.01); *G01G 19/52* (2013.01); *G01G 19/62* (2013.01); *G06F 18/217* (2023.01); *G06N 3/02* (2013.01)

(58) Field of Classification Search
CPC .............. G01G 19/387; G01G 19/393; G01G 19/4144; G01G 19/417; G01G 19/62; G01G 19/414; G06F 18/217; G06N 3/02
See application file for complete search history.

(56) References Cited

U.S. PATENT DOCUMENTS

| | | | | |
|---|---|---|---|---|
| 4,976,377 A | * | 12/1990 | Higuchi | G01G 13/285 706/900 |
| 5,163,010 A | * | 11/1992 | Klein | B01F 33/8442 366/152.2 |
| 9,296,120 B2 | | 3/2016 | McLaughlin | |

(Continued)

FOREIGN PATENT DOCUMENTS

| | | | | |
|---|---|---|---|---|
| EP | 0 443 741 A1 | * | 8/1991 | ............. A45D 44/00 |
| EP | 3466624 | | 4/2019 | |

OTHER PUBLICATIONS

Mell et al., "The NIST Definition of Cloud Computing", National Institute of Standards and Technology, U.S. Department of Commerce, NIST Special Publication 800-145, Sep. 2011, 7 pages.

*Primary Examiner* — Randy W Gibson

(74) *Attorney, Agent, or Firm* — Michael A. Petrocelli

(57) ABSTRACT

Reducing an average give-away rate of a weighing device by determining a weight of a product of a weighing device that includes an article, determining one or more conditions of an environment of the weighing device, determining a state of the environment of the weighing device, wherein the state relates to an average give-away rate of the environment of the weighing device, determining a reward value for the state of the environment of the weighing device, wherein the reward value is based at least in part on the weight of the product, and generating a set of parameters for the weighing device based at least in part on the environment, the state, and the reward.

20 Claims, 6 Drawing Sheets

(51) Int. Cl.
*G06F 18/21* (2023.01)
*G06N 3/02* (2006.01)

(56) References Cited

U.S. PATENT DOCUMENTS

| | | |
|---|---|---|
| 9,919,446 B2 | 3/2018 | Seager |
| 2016/0279329 A1* | 9/2016 | Faisal ................. A61M 5/1723 |
| 2017/0127884 A1 | 5/2017 | Oddera |
| 2021/0172787 A1* | 6/2021 | Sato .......................... B65B 1/32 |
| 2023/0127741 A1* | 4/2023 | Kips ...................... A45D 44/00 |
| | | 132/286 |

* cited by examiner

ADJUSTING PARAMETERS OF WEIGHING DEVICE FOR REDUCING AVERAGE GIVEAWAY RATE WHEN PACKAGING AN ARTICLE

BACKGROUND

The disclosure relates generally to the field of computer technologies. The disclosure relates particularly to reducing an average give-away rate of a weighing device.

The Deep Q-Network (DQN) is an algorithm that is able to solve a wide range of tasks by combining reinforcement learning and deep neural networks at scale. The algorithm was developed by enhancing a classic RL algorithm called Q-Learning with deep neural networks and a technique called experience replay. Reinforcement learning (RL) is a general framework where agents learn to perform actions in an environment so as to maximize a reward. Q-learning is a model-free reinforcement learning algorithm, which learns the value of an action in a particular state, and can handle problems with stochastic transitions and rewards without requiring adaptations. Experience replay is a method for goal-conditioned RL that involves storing an experience of an agent at various states and learning from previous failed attempts to complete a task.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable reducing an average give-away rate of a weighing device.

Aspects of the invention disclose methods, systems and computer readable media associated with reducing an average give-away rate of a weighing device by determining a weight of a product of a weighing device that includes an article, determining one or more conditions of an environment of the weighing device, determining a state of the environment of the weighing device, wherein the state relates to an average give-away rate of the environment of the weighing device, determining a reward value for the state of the environment of the weighing device, wherein the reward value is based at least in part on the weight of the product, and generating a set of parameters for the weighing device based at least in part on the environment, the state, and the reward.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
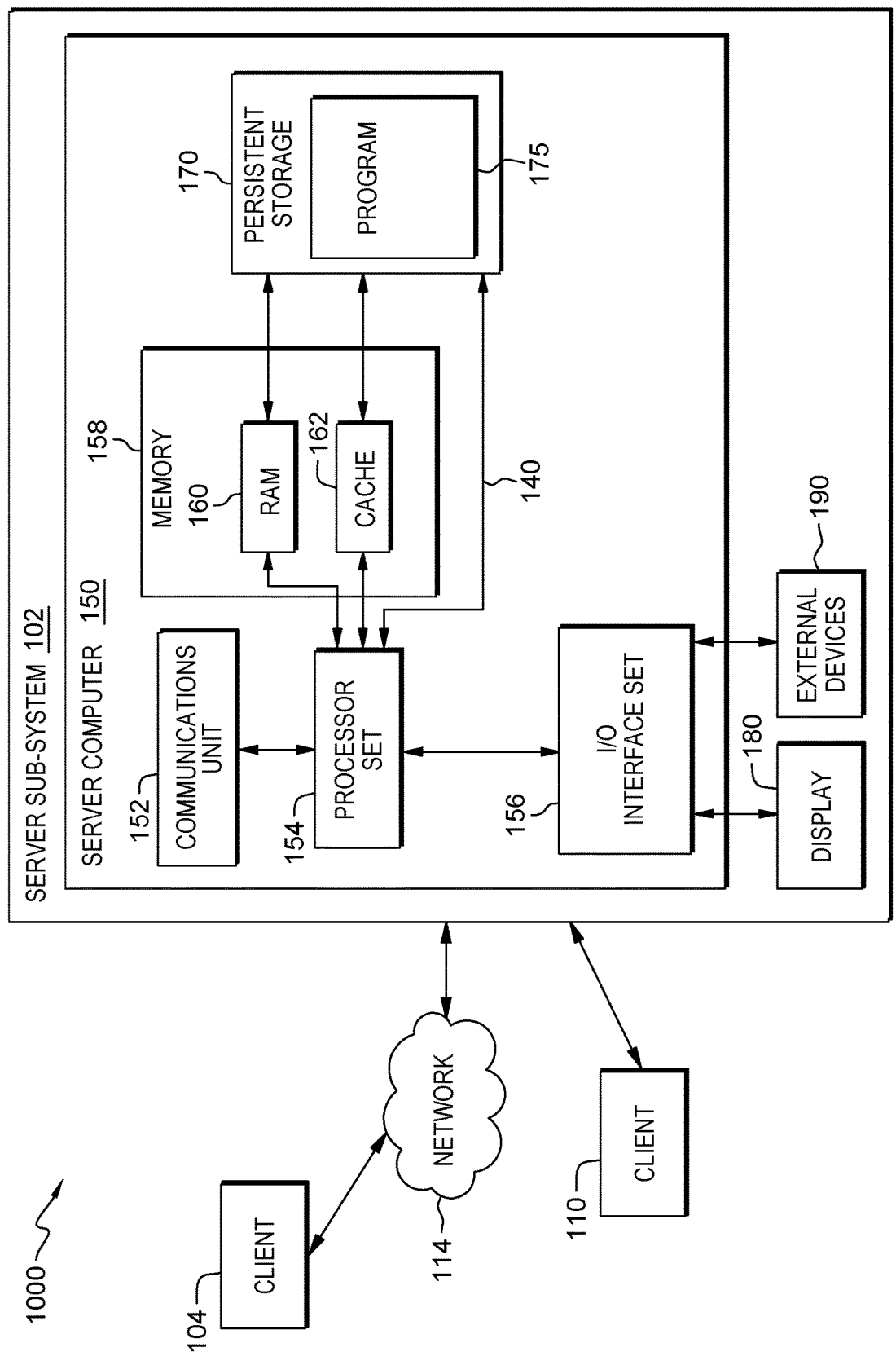
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Due to the regulation of product packaging industries, packaging processes are automated in order to adhere to strict weight requirements based on product specifications. As a consequence, a target weight is reached or exceeded, where the target weight is usually exceeded. Moreover, overfeeding problems can be attributed to the average give-away rate being too high, resulting in millions of dollars in annual economic loss. Existing solutions to solve the problem of excessively high average give-away rate rely on expert experience to focus on adjusting the key parameters found in the past packaging processes and are cumbersome and time-consuming, but do not properly integrate the environment in the solution process. Embodiments of the present invention allow for reduction in the average give-away rate without changing the mechanical design of the existing weighing hardware equipment. Additionally, the embodiments of the present invention utilize factors related to the packaging environment (e.g., temperature, humidity, material size, shape, assembly line batches, etc.) as an interactive environment, and enables a confrontation mechanism that aims at the average give-away rate to counter rewards and punishments. Embodiments of the present invention enable independently automatically adjusting the operating parameters of the weighing equipment to achieve the purpose of reducing the average give-away rate in the packaging process.

In an embodiment, one or more components of the system can employ hardware and/or software to solve problems that are highly technical in nature (e.g., generating a set of parameters for the weighing device based at least in part on the environment, the state, and the reward). These solutions are not abstract and cannot be performed as a set of mental acts by a human due to the processing capabilities needed to facilitate reducing an average give-away rate of a weighing device, for example. Further, some of the processes performed may be performed by a specialized computer for carrying out defined tasks related to generating a set of parameters for the weighing device based at least in part on the environment, the state, and the reward. For example, a specialized computer can be employed to carry out tasks related to determine a reward value for the state of the environment of the weighing device, wherein the reward value is based at least in part on the weight of the packaged product or the like.

Implementation of embodiments of the invention may take a variety of forms, and exemplary implementation details are discussed subsequently with reference to the FIGS.

In an embodiment, a system executing a weighing device parameter modification method determines a weight of an article for a product of a weighing device. The method sets initial parameters (e.g., random parameters) for the weighing device utilizing a randomization method to start weighing of articles for packaging of the product. Additionally, the method utilizes notification data of the weighing device to determine that a pass rate of the articles of the weighing device for packaging of the product is greater than a threshold pass rate. For example, the method can utilize fault codes and/or low pass rate notification (e.g., notification data) of a multi-head weigher to determine if the articles are flowing (e.g., passing) into packaging at an acceptable rate (i.e., greater than the threshold pass rate). In this embodiment, once the method determines that the pass rate exceeds a threshold pass rate, the method receives data that includes a weight (e.g., final weight) of one or more packaged products including the articles from sensors of a weight checking device. Furthermore, the method determines an overall average give-away rate of the weighing device for the product with respect to the initial parameters. The method calculates the overall average give-away rate using a target weight according to a specification of an article of the product that includes the articles. For example, the method determines the amount of weight over or under a target weight for each packaged product of an article based on a final weight of each packaged product and determines an overall average give-away rate for a multi-head weigher (e.g., weighing device) utilizing an initial set of parameters.

In an embodiment, the method determines conditions of an environment of the weighing device. During the production and packaging process of a batch of products the environment includes the physical environment (e.g., temperature, humidity), physical attributes of an article of a product (e.g., size, shape, density, moisture (e.g., grease), etc.), other environmental factors, and overall average give-away rate for a multi-head weigher. The method collects the environment data from sensors and other devices in the physical environment of the weighing. For example, the method can collect a set of physical environment data from one or more sensors associated with an environment of a weighing device. In another example, the method can collect a set of product attribute data, which corresponds to physical attributes of a product of the product packaging, from one or more sensors associated with an environment of a weighing device. In this embodiment, the method stores the environmental data with respect to an average give-away rate of the weighing device, reward value, and/or current iteration (e.g., state). In another embodiment, the method detects changes in the environment of the weighing device by comparing and identifying variations in one or more conditions over a defined time-period (e.g., an iteration, default time frame, state, etc.).

In an embodiment, the method determines a state of an environment of a weighing device. The state of an environment of the weighing device includes the average give-away rate of a weighing device for a present environment of the weighing device (i.e., average give-away rate of current application environment or current iteration). The method identifies and sets states of the weighing device during an execution of the method. In this embodiment, the method detects changes in the environment of the weighing device by comparing and identifying variations in one or more conditions, the average give-away rate, and/or parameters over a defined time-period (e.g., an iteration, default time frame, state, etc.). For example, the method identifies a trigger in an environment of a weighing device and iterates a value that corresponds to a state of the environment of the weighing device. In this example, the trigger may be a change in a condition of the environment, change in parameters of the weighing device, and/or a change in an average give-away rate of the weighing device.

In an embodiment, the method determines a reward value for a state of an environment of a weighing device to reduce the give-away rate without changing the mechanical design of the existing weighing hardware equipment of the weighing device. The method enables a confrontation mechanism that aims at an average give-away rate to counter rewards and punishments, which aids the judgement of a virtual agent in determining whether results (e.g., average give-away rates) on mocked environment are suitable and in generating parameter data sets for the weighing device that reduce the average give-away rate. The method determines a reward value for each state of the weighing device.

In this embodiment, the method utilizes a reward function for the purpose of making the average give-away rate lower by maximizing the sum of the reward values in a cumulative iteration process. For example, the method can utilize an equation for the reward functions that includes:

$$-\operatorname{argmin}(\Sigma \log(\xi_i c_i + (1-\xi_i) h_i) + \sigma(d_i)) \qquad (1)$$

$$s.\ t\ 1/n\Sigma_i H[(\text{weight}^i_{final} - \text{weight}_{target})] > 0.7 \qquad (2)$$

where, '$\xi_i$' represents the dynamic interaction coefficient under the current iteration, and the calculation method is shown in the formula below. 'H[x]' is the unit step function. When the independent variable is greater than or equal to zero (0), it is set as one (1), and when the independent variable is less than zero (0), it is set as zero (0). 'n' is the number of packages for the current batch.

$$\xi_i \text{current\_parameter\_number/all\_parameter\_number} \qquad (3)$$

'$c_i$' and '$h_i$' are a current average give-away rate and historical average give-away rate respectively. '$\sigma(d_i)$' is the difference reward between adjacent iterations (e.g., states). In this example, the method determines a reward for a state by dividing a current reward value by the number of adjusted parameters based on positive and negative values, which can be utilized to determine an overall average give-away rate.

Embodiments of the disclosed invention recognize that the weighting device includes hundreds of adjustable parameters, and the method achieves the optimal effect (i.e., reducing average give-away rate) with the minimum parameter adjustment amount in the formula. In the iteration preprocess, the number of adjusted parameters will change, plus the change of historical give-way rate (e.g., overall average give-away rate), the reward function of the method will increase or decrease the reward value according to the interaction situation in each iteration (e.g., state).

In an embodiment, the method generates a set of parameters for a weighing device based at least in part on the environment, the state, and/or the reward of the weighing device. The method utilizes historical weighing data to learn parameter behavior of the weighing device from the historical weighing data. The historical condition of the pipeline is regarded as a whole automation applications. This method utilizes intelligent algorithms such as probabilistic model, machine learning, deep learning or reinforcement learning to generate a policy network consisting of one or more strategy models (i.e., reinforcement learning Deep Q-Network (DQN)).

In an embodiment, the method utilizes three DQNs (e.g., a classic RL algorithm called Q-Learning with deep neural networks and a technique called experience replay) to generate a set of parameter optimization candidates. Experience Replay is a replay memory technique used in reinforcement learning where experiences of an agent are stored at each time-step and pooled over many episodes into a replay memory. For example, at each time step of data collection, the method adds the transitions a circular buffer called the replay buffer (e.g., replay memory). Then during training, instead of using just the latest transition to compute the loss and its gradient, the method computes the loss and its gradient using a mini batch of transitions sampled from the replay buffer. This has two advantages: better data efficiency by reusing each transition in many updates, and better stability using uncorrelated transitions in a batch. In this example, the method utilizes a historical strategy network, current strategy network, and combined strategy network. The history strategy network stores the historical parameters of the weighing device in the previous policy network. Current strategy network is used for the training of this action. The input is the current set of parameters of the weighing device and the reward associated with the environment. Additionally, the method merges the current strategy network with history strategy network to form the combined strategy network, which outputs a set of parameter optimization candidates for selection by the method.

In an embodiment, the method modifies one or more parameters of the set of parameters for the weighing device based at least in part on the reward value for the state of the environment of the weighing device. The method selects one or more parameter candidates (e.g., generated set of parameters) of a DQN algorithm and adjust parameters of the weighing device. The method adjust parameters in a parameter optimization scheme of the weighing device by modifying at least one or more parameters of the parameter optimization scheme.

In another embodiment, the method collects feedback data of the environment of the weighing device for each state. The feedback data relates to the environment of the weighing device and can include data such as reward values, average give-away rates, states, etc. For example, the method can utilize an equation for the target error that includes:

$$tgt_{error} = weight^i_{final} - weight_{target} \quad (4)$$

where, '$tgt_{error}$' represents the amount of weight of a packaged product is over a target weight '$weight_{target}$' for a packaged product, '$weight^i_{final}$' is a final weight of a packaged product during a current state, and the '$weight_{target}$' is derived from a specification of an article of the packaged product. In this example, the method utilizes the target error to determine a pass rate of packaged products of a weighing device utilizing a current set of parameters. Additionally, the method can utilize an equation for the pass rate that includes:

$$\text{pass rate} = (\text{count}(tgt_{terror} > 0))/(\text{count}(all)) \quad (5)$$

where, 'pass rate' represents the number of packaged products that meet requirements of a specification of an article of the packaged product.

In this embodiment, the method collects feedback data iteratively to identify an optimal set of parameters for the weighing device based on the collected feedback data. The optimal set of parameters result in an optimal state, which includes a set of parameters corresponding to an average give-away rate that is less than or equal to a threshold give-away rate of a target average give-away rate based on a specification of an article of product. The method modifies the one or more parameters of the set of parameters for the weighing device based on the optimal set of parameters or the generated set of parameters for each state until a predefined iteration time is met or the average give-away rate reaches the target average give-away rate (i.e., when the method receives the feedback that includes the reward for the current environment, the method will automatically generate another set of parameters which may be better than the previous set of parameters). The method can transmit the final optimal parameters to the history strategy network for synchronization. Embodiments of the present invention recognize that using reinforcement learning technology to adjust parameters in real-time combined with the production environment improves the efficiency of parameter adjustment. Additionally, considering the physical environment, the physical attribute characteristics of the product, setting the average over-rate change as a reward and punishment function, and timely feedback and timely adjustment of parameters result in more detailed and timelier granular parameter adjustment.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise application program (not shown) together with sufficient computing resource (processor, memory, network communications hardware) to execute the program.

As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment may be made by those skilled in the art without departing from the scope of the invention as recited by the claims.

The present invention may contain various accessible data sources, such as client device 110 and client device 104, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 175 enables the authorized and secure processing of personal data. Program 175 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Program 175 provides information regarding personal data and the nature (e.g., type, scope, purpose, duration, etc.) of the processing. Program 175 provides the user with copies of stored personal data. Program 175 allows the correction or completion of incorrect or incomplete personal data. Program 175 allows the immediate deletion of personal data.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
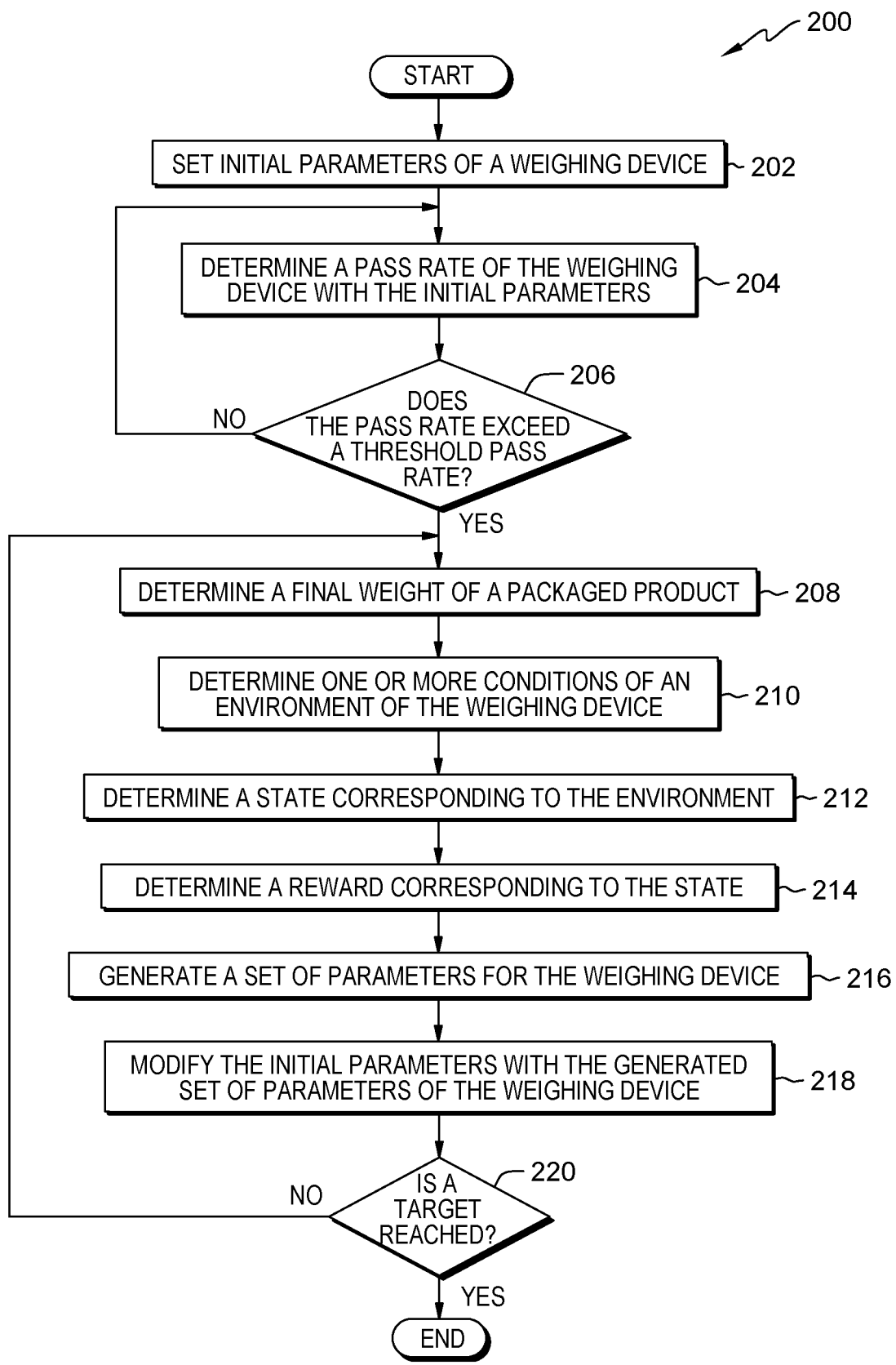
FIG. 2 provides a flowchart depicting an operational sequence, according to an embodiment of the invention.

FIG. 2 provides a flowchart 200, illustrating exemplary activities associated with the practice of the disclosure. In one embodiment, program 175 initiates in response to a user connecting client device 110 to program 175 through network 114. For example, program 175 initiates in response to a user registering (e.g., opting-in) a multi-head weigher (e.g., client device 110) with program 175 via a WLAN (e.g., network 114). In another embodiment, program 175 is a background application that continuously monitors client device 110. For example, program 175 is a client-side application that initiates upon powering on a multi-head weigher (e.g., client device 110) of a user and monitors data of the multi-head weigher.

After program start, at block 202, the method of program 175 sets an initial parameter of a weighing device. In an embodiment, the method utilizes randomization methods to set initial parameters of a weighing device.

At block 204, the method of program 175, determines a pass rate of the weighing device with the initial parameters. In an embodiment, the method determines a pass rate of a weighing device based on sensor data of the weighing device. In another embodiment, the method determines a pass rate of a weighing device based on error codes corresponding to the pass rate of the weighing device.

At block 206, the method of program 175, determines whether the pass rate exceeds a threshold pass rate. In an embodiment, the method determines whether a pass rate of a weighing device utilizing an initial set of parameters exceeds a threshold pass rate for an article of a product. In one scenario, if the method determines that a pass rate of a weighing device utilizing an initial set of parameters does not exceed a threshold pass rate for an article of a product, then the method modifies the initial set of parameters and continues to monitor the pass rate of the weighing device. In another scenario, if the method determines that a pass rate of a weighing device utilizing an initial set of parameters exceeds a threshold pass rate for an article of a product, then the method moves to block 208.

At block 208, the method of program 175, determines a final weight of a packaged product. In an embodiment, the method utilizes sensor data of a weight checker associated with a weighing device to determine a weight of package of a product that includes an article. In this embodiment, the method utilizes a target weight of the packaged product from a specification of an article of the packaged product to calculate the average give-away weight for the packaged product corresponding to a current set of parameters of the weighing device.

At block 210, the method of program 175, determines one or more conditions of an environment of the weighing device. In an embodiment, the method collects sensor data of a weighing device and/or other devices within a physical environment of the weighing device. In this embodiment, the method utilizes the collected sensor data to identify conditions corresponding to an article of a product and/or related to the packaging environment of the weighing device. In terms of environment, the method not only considers external physical environment attributes, but additionally considers attributes of articles of the packaged product.

At block 212, the method of program 175, determines a state corresponding to the environment. In an embodiment, the method utilizes a final weight of one or more packaged products of a current environment of a weighing device and determines an average give-away rate (e.g., state) for the current environment using a target weight of a specification of an article of a packaged product (i.e., the method determines a state for one or more batches/lots of packaged products of a weighing device).

At block 214, the method of program 175, determines a reward corresponding to the state. In an embodiment, the method utilizes the change in an average give-away rate to determine a reward/punishment for a current state of a weighing device. In this embodiment, the method generates a joint evaluation method for batch qualification rate and average give-away rate.

At block 216, the method of program 175, generates a set of parameters for the weighing device. In an embodiment, the method generates a set of parameters for a weighing device using conditions of an environment associated with the weighing device, a reward value, and/or state. In this embodiment, the method can iteratively generate a set of parameters for each state associated with an environment of the weighing device. As a result, the method considers the physical environment and attribute characteristics of a packaged product and sets the average give-away rate change as a reward and punishment function to provide timely feedback and timely adjustment of a set of parameters, wherein the parameter adjustment is granular, more detailed, and timely, which can reduce the average give-away rate to a greater extent.

At block 218, the method of program 175, modifies the initial parameters with the generated set of parameters of the weighing device. In an embodiment, the method automatically adjusts initial parameters of a weighing device using the generated set of parameters as discussed at block 216. In this embodiment, the method eliminates reliance on expert experience to adjust the key parameters found effective in the past processes, and without changing the mechanical design of the existing weighing hardware equipment.

At block 220, the method of program 175, determines whether a target is reached. In an embodiment, the method continues to modify a set of parameters of the weighing device until a predefined number of iterations and/or target average give-away rate are reached. In this embodiment, the method can utilize reinforcement learning technology to adjust parameters in real time combined with the production environment to improve the efficiency of parameter adjustments, which enables continuous optimization and adaptability to be widely used in various industries.

Figure 3:
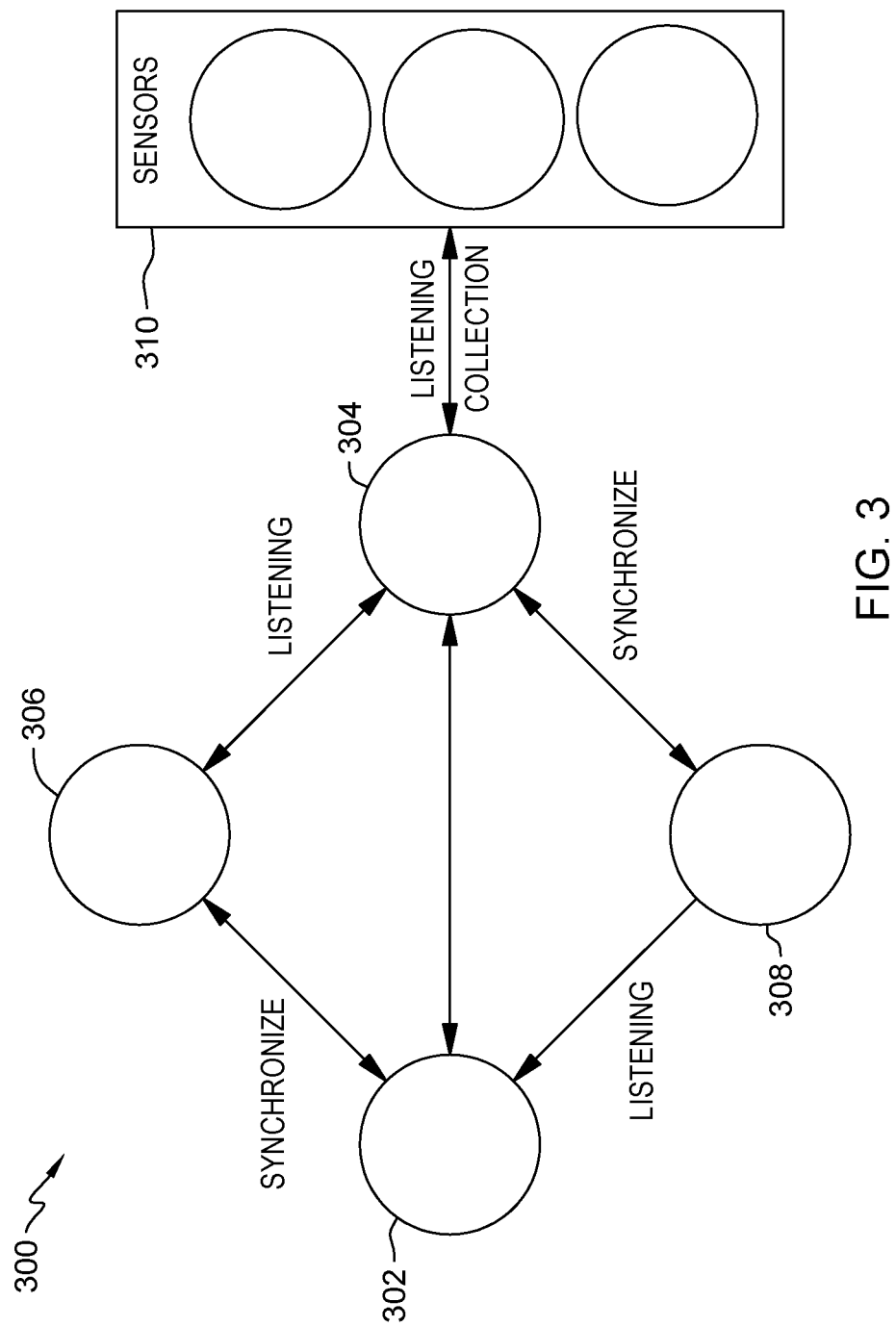
FIG. 3 is a diagram depicting an instance of a mechanism for reward and punishment that utilizes an interaction process between nodes, in accordance with embodiments of the present invention.

Referring now to FIG. 3, in various embodiments of the disclosure a parameter generation and adjustment method using historical data modeling may be implemented as four different program interactions or four methods of a program.

FIG. 3 depicts node network 300, which is an example illustration of a mechanism for reward and punishment that utilizes an interaction process between nodes to automatically update and adjust parameters of a multi-head weigher (e.g., weighing device), in accordance with example embodiments of the present invention. Node network 300 includes agent node 302, environment node 304, action node 306, update node 308, and sensors 310. Agent Node 302 corresponds to a reinforcement learning DQN, and automatically generates setting parameters of a multi-head weigher. Environment node 304 collects data from sensors 310 of devices in the physical environment and utilizes certain storage space to store the relevant environment data, state, and reward value generated by iteration during the process. Here, state refers to the average give-away rate of the current iteration. Action node 306 adjusts multi-head weigher parameters based on parameters generated by agent node 302. Update node 308 monitors the output of agent node 302 and collects feedback to update the status to environment node 304. Sensors 310 are a devices, modules, machines, or subsystems whose purpose is to detect events or changes in a packaging environment and send the information to other electronics.

For example, a reinforcement learning task is about training an Agent (e.g., agent node 302). In an initial state, parameters of a multi-head weigher are randomly set, and as nodes interact data of the multi-weigher is iteratively updated based on node interactions. The nodes interact with each other by listening for triggering events (e.g., updates to nodes, threshold change in states, threshold changes in target error or average give-away rate, etc.), passing the set state, updating parameters, and calculating a reward value. Agent node 302 is responsible for generating a new set of parameter values. Environment node 304 captures changes in an environment of a multi-head weigher, calculate reward values, and store the current state. Action node 306 is responsible for performing actions and state transfer. Update node 308 is responsible for collecting feedback and updating the current state to environment node 304. Environment node 304 calculates a target error of each packaged product of a multi-head weigher during a state and the specification weight by utilizing the final weight of each packaged product, which improves the effectiveness of parameters and the model training process is optimized due to constraints of the specification weight.

Additionally, agent node 302 transitions between different scenarios of environment node 304, referred to as states, by performing actions using action node 306. Actions, in return, yield rewards calculated by environment node 304, which could be positive, negative or zero. The purpose of agent node 302 is to maximize the total reward it collects over an episode, which is everything that happens between an initial state and a terminal state. Hence, the method incentivizes agent node 302 to perform certain actions by providing agent node 302 with positive rewards, and to avoid others by providing negative rewards. This is how agent node 302 learns to develop a strategy, or a policy. Compared with the previous use of target optimization methods known in the art for parameter adjustment, the method's innovative introduction of reinforcement learning in real-time interaction with the environment for parameter adjustment improves the efficiency of parameter adjustment of weighing devices.

In an example embodiment, the principle of reward and punishment is to set the reward function, which is implemented by the update node 308 (i.e., identifying an amount of change of the reward value between states of the weighing device to prevent the reward value from being in penalty state or reward state all the time). In one scenario, if agent node 302 reduces a give-away rate of a first iteration and the number parameter adjustments, then the reward value will increase. By adding the change of reward value, interaction of agent node 302 can be enhanced with environment node 304. Agent node 302 and action node 306 automatically generate a set of new parameter values according to the parameter generation and adjustment mechanism. Update node 308 calculates the reward function value with the new parameter value as input and updates the current status to environment node 304. The whole process is an automated closed loop until the pre-defined final goal is reached (i.e., the average give-away rate reaches a threshold give-away rate or the number of iterations reaches a pre-defined value), then the modeling is finished.

Figure 4:
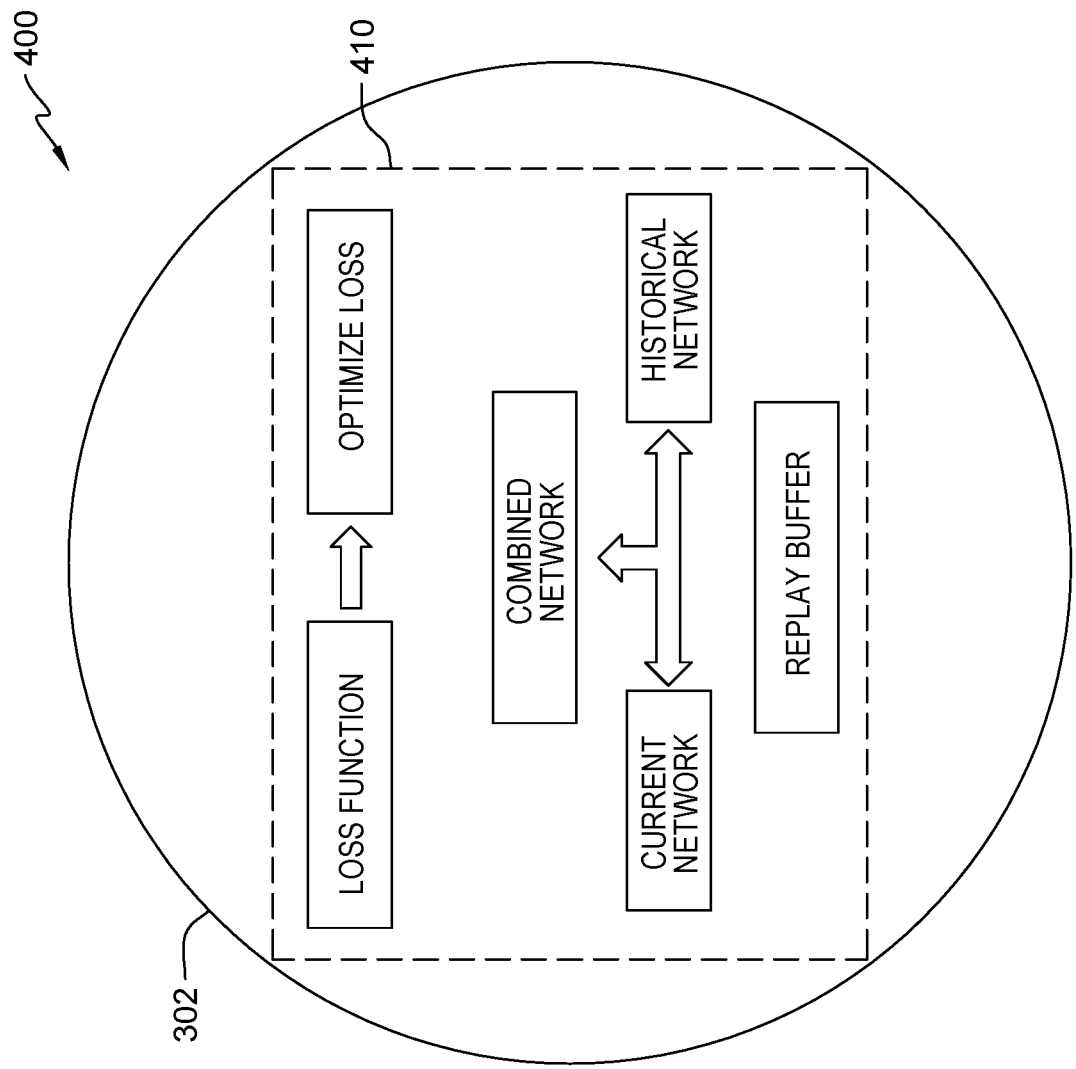
FIG. 4 is a diagram depicting an instance of a Deep Q-Network (DQN) architecture, in accordance with embodiments of the present invention.

FIG. 4 depicts agent DQN 400, which is an example illustration of a DQN architecture of agent node 302, in accordance with example embodiments of the present invention. DQN 400 includes agent node 302 and model 410. Agent Node 302 corresponds to a reinforcement learning DQN, and automatically generates setting parameters of a multi-head weigher. Model 410 is one or more models of agent 302 utilizes to generate a set of parameters for a multi-head weigher. Loss function is a function that maps an event or values of one or more variables onto a real number intuitively representing some "cost" associated with the event. Agent 302 generates parameters of the multi-head weigher in order to optimize loss based on outputs of a combined network. The combined network utilizes the outputs of a current network and historical network to generate sets of parameters. A sequence of experience tuples (e.g., state$_t$, reward, action state$_{t+1}$, done) can be highly correlated and Q-learning algorithms that learns from each of these experiences tuples in sequential order run the risk of getting swayed by the effects of this correlation. Thus, agent node 302 utilizes an experience replay technique and a replay buffer to sample a small batch of tuples from the replay buffer in order to learn, which breaks harmful correlations allowing the method to learn more from individual tuples multiple times, recall rare occurrences, and in general make better use of experiences.

For example, agent node 302 implements a historical strategy model (e.g., historical network), which during each iteration, agent node 302 stores history-generated multi-head weigher parameters, environment node 304 historical data, and other information as the input of the historical strategy model. Additionally, integrating the results of the iterative process, the model will generate new historical strategy feedback.

In this example, agent node 302 implements a current strategy model (e.g., current network), which collects feedback data of environment node 304, such as but not limited to pipeline state information, physical environment information, material attribute information, and other data as input of the current strategy model. Agent node 302 combines the current strategy model with the historical strategy feedback to generate a new adjustment strategy for the multi-head weigher. Also, agent node 302 utilizes the output results of the two strategy models as the input data (e.g., historical policy feedback and new adjustment policy action) of an ensemble model (e.g., combined network), and then Agent node 302 passes an output (e.g., set of parameters for the multi-head weigher) of the ensemble model to action node 306 to modify parameters of the multi-head weigher.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
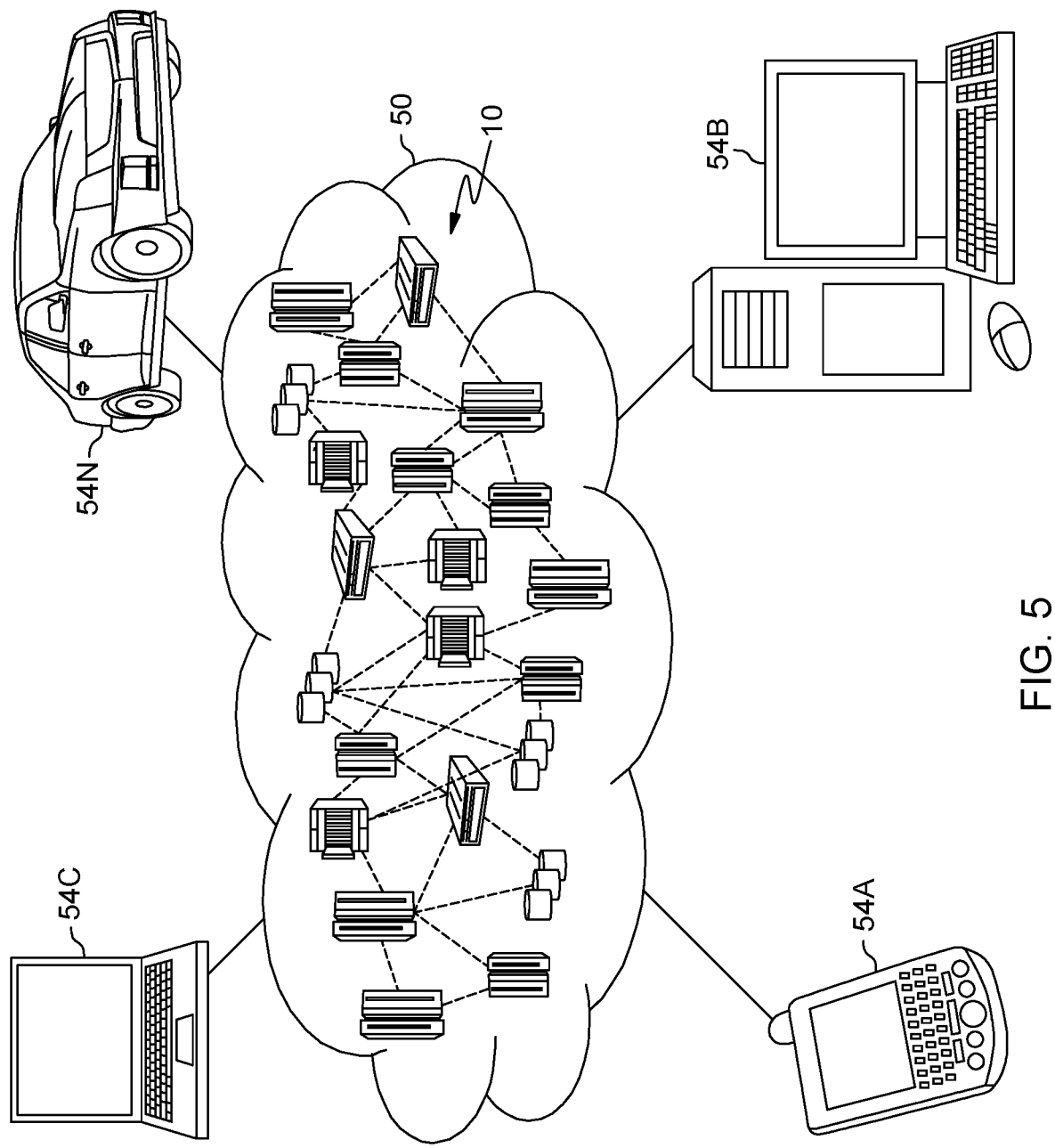
FIG. 5 depicts a cloud computing environment, according to an embodiment of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
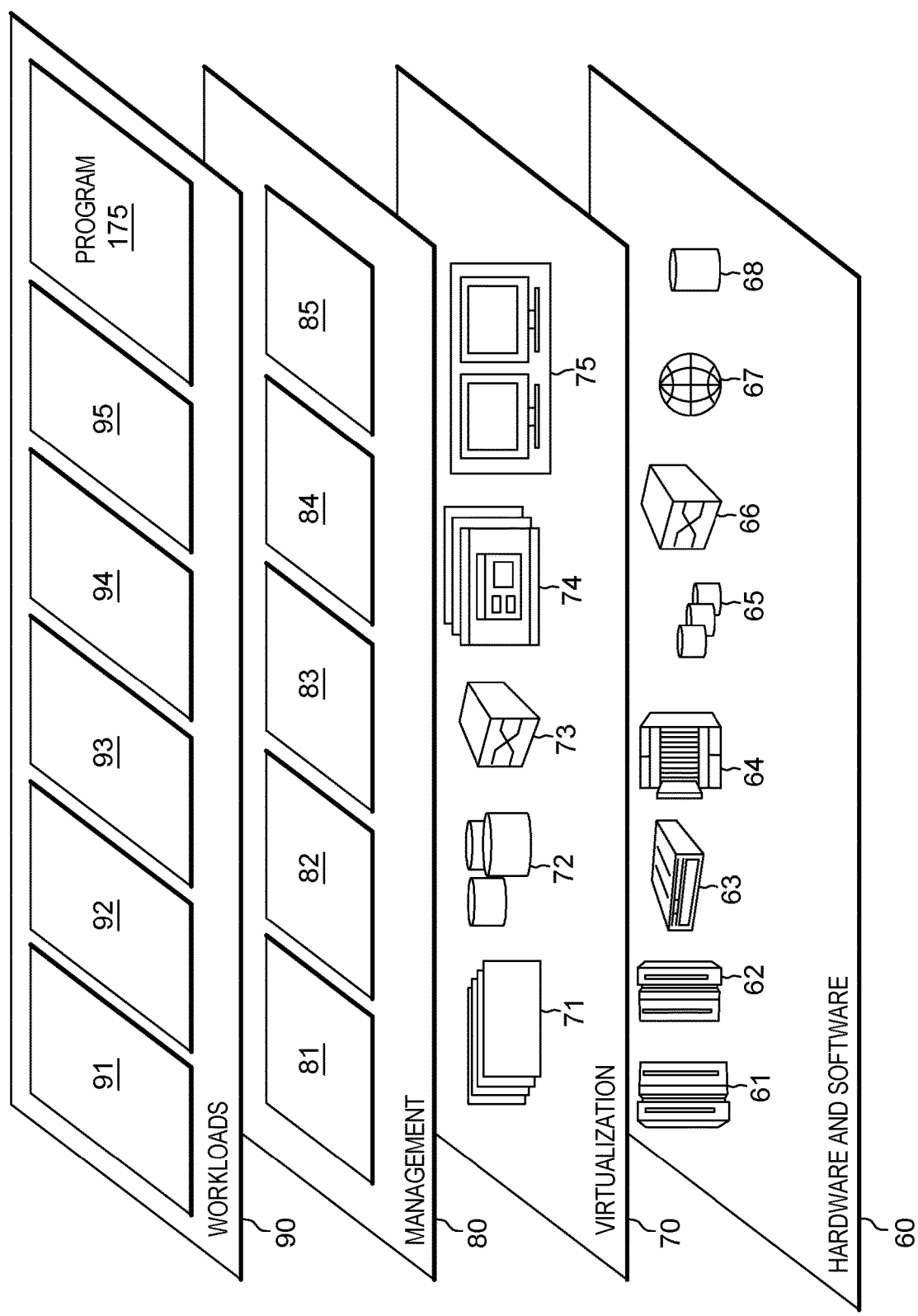
FIG. 6 depicts abstraction model layers, according to an embodiment of the invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for reducing an average give-away rate of a weighing device, the method comprising:
   determining a weight of a product of a weighing device that includes an article;
   determining one or more conditions of an environment of the weighing device;
   determining a state of the environment of the weighing device, wherein the state relates to an average give-away rate of the environment of the weighing device;
   determining a change in the environment of the weighing device by identifying and comparing variations in, at least in part, the one or more conditions of the environment of the weighing device and the average give-away rate over a defined time period;

based on the determined change, determining a reward value for the state of the environment of the weighing device, wherein the reward value is based at least in part on the weight of the product, the reward value being associated with a reduction of the average give-away rate without changing a mechanical design of an existing weighing hardware equipment of the weighing device;

iteratively generating a set of parameters for the weighing device based on the one or more conditions of the environment of the weighing device, the reward value, and the state of the environment of the weighing device;

the iteratively generating of the set of parameters being for each state associated with the environment of the weighing device, which includes considering a physical environment and attribute characteristics of a packaged product and setting an average give-away rate change as a reward and punishment function to provide timely feedback and timely adjustment of the set of parameters; and determining the reward for the state by dividing the reward value by a number of adjusted parameters based on positive and negative values, which are utilized to determine the average give-away rate.

2. The computer implemented method according to claim 1, further comprising:

modifying one or more parameters of the set of parameters for the weighing device based at least in part on the reward value for the state of the environment of the weighing device.

3. The computer implemented method according to claim 2, further comprising:

collecting iterative feedback data of the environment of the weighing device, wherein the feedback data relates to the environment of the weighing device;

identifying an optimal set of parameters for the weighing device based on the iterative feedback data, wherein the optimal set of parameters result in the average give-away rate of the weighing device meeting a target give-away rate, wherein the target give-away rate is based at least in part on a target weight of the product; and modifying the one or more parameters of the set of parameters for the weighing device based on the optimal set of parameters.

4. The computer implemented method according to claim 2, wherein the reward value for the state of the environment of the weighing device is based at least in part on the average give-away rate of the state, an overall average give-away rate of the weighing device, and an amount of modified parameters for the state of the environment of the weighing device.

5. The computer implemented method according to claim 1, further comprising:

generating an initial set of parameters for the weighing device;

determining a weight of one or more products associated with the initial set of parameters;

determining that a pass rate for the one or more products of the weighing device exceeds a threshold pass rate; and determining an overall average give-away rate of the weighing device for the one or more products based at least in part on the weight of the one or more products.

6. The computer implemented method according to claim 1, wherein determining the one or more conditions of the environment of the weighing device, further comprises:

collecting a set of physical environment data from one or more sensors associated with the environment of the weighing device;

collecting a set of product attribute data from the one or more sensors associated with the environment of the weighing device, wherein the set of product attribute data corresponds to physical attributes of the article of the product; and generating a set of conditions corresponding to the environment of the weighing device based at least in part on the set of physical environment data and the set of product attribute data.

7. The computer implemented method according to claim 1, wherein generating the set of parameters for the weighing device based on the one or more conditions of the environment of the weighing device, the reward value, and the state of the environment of the weighing device, comprises:

selecting one or more parameter candidates of a Deep Q-Network (DQN) algorithm based at least in part on the reward value.

8. A computer program product for reducing an average give-away rate of a weighing device, the computer program product comprising one or more computer readable storage devices and collectively stored program instructions on the one or more computer readable storage devices, the stored program instructions comprising:

program instructions to determine a weight of a product of a weighing device that includes an article;

program instructions to determine one or more conditions of an environment of the weighing device;

program instructions to determine a state of the environment of the weighing device, wherein the state relates to an average give-away rate of the environment of the weighing device;

program instructions to determine a change in the environment of the weighing device by identifying and comparing variations in, at least in part, the one or more conditions of the environment of the weighing device and the average give-away rate over a defined time period;

based on the determined change, program instructions to determine a reward value for the state of the environment of the weighing device, wherein the reward value is based at least in part on the weight of the product, the reward value being associated with a reduction of the average give-away rate without changing a mechanical design of an existing weighing hardware equipment of the weighing device;

program instructions to iteratively generate a set of parameters for the weighing device based on the one or more conditions of the environment of the weighing device, the reward value, and the state of the environment of the weighing device;

program instructions to the iterative generation of the set of parameters for each state associated with the environment of the weighing device, which includes considering a physical environment and attribute characteristics of a packaged product and setting an average give-away rate change as a reward and punishment function to provide timely feedback and timely adjustment of the set of parameters; and program instructions to determine the reward for the state by dividing the reward value by a number of adjusted parameters based on positive and negative values, which are utilized to determine the average give-away rate.

9. The computer program product according to claim 8, the stored program instructions further comprising:
program instructions to modify one or more parameters of the set of parameters for the weighing device based at least in part on the reward value for the state of the environment of the weighing device.

10. The computer program product according to claim 9, the stored program instructions further comprising:
program instructions to collect iterative feedback data of the environment of the weighing device, wherein the feedback data relates to the environment of the weighing device;
program instructions to identify an optimal set of parameters for the weighing device based on the iterative feedback data, wherein the optimal set of parameters result in the average give-away rate of the weighing device meeting a target give-away rate, wherein the target give-away rate is based at least in part on a target weight of the product; and
program instructions to modify the one or more parameters of the set of parameters for the weighing device based on the optimal set of parameters.

11. The computer program product according to claim 9, wherein the reward value for the state of the environment of the weighing device is based at least in part on the average give-away rate of the state, an overall average give-away rate of the weighing device, and an amount of modified parameters for the state of the environment of the weighing device.

12. The computer program product according to claim 8, the stored program instructions further comprising:
program instructions to generate an initial set of parameters for the weighing device;
program instructions to determine a weight of one or more products associated with the initial set of parameters;
program instructions to determine that a pass rate for the one or more products of the weighing device exceeds a threshold pass rate; and
program instructions to determine an overall average give-away rate of the weighing device for the one or more products based at least in part on the weight of the one or more products.

13. The computer program product according to claim 8, wherein program instructions to determine the one or more conditions of the environment of the weighing device, further comprise program instructions to:
collect a set of physical environment data from one or more sensors associated with the environment of the weighing device;
collect a set of product attribute data from the one or more sensors associated with the environment of the weighing device, wherein the set of product attribute data corresponds to physical attributes of the article of the product; and
generate a set of conditions corresponding to the environment of the weighing device based at least in part on the set of physical environment data and the set of product attribute data.

14. The computer program product according to claim 8, wherein program instructions to generate the set of parameters for the weighing device based on the one or more conditions of the environment of the weighing device, the reward value, and the state of the environment of the weighing device, further comprise program instructions to:
select one or more parameter candidates of a Deep Q-Network (DQN) algorithm based at least in part on the reward value.

15. A computer system for reducing an average give-away rate of a weighing device, the computer system comprising:
one or more computer processors;
one or more computer readable storage devices; and
stored program instructions on the one or more computer readable storage devices for execution by the one or more computer processors, the stored program instructions comprising:
program instructions to determine a weight of a product of a weighing device that includes an article;
program instructions to determine one or more conditions of an environment of the weighing device;
program instructions to determine a state of the environment of the weighing device, wherein the state relates to an average give-away rate of the environment of the weighing device;
program instructions to determine a change in the environment of the weighing device by identifying and comparing variations in, at least in part, the one or more conditions of the environment of the weighing device and the average give-away rate over a defined time period;
based on the determined change, program instructions to determine a reward value for the state of the environment of the weighing device, wherein the reward value is based at least in part on the weight of the product, the reward value being associated with a reduction of the average give-away rate without changing a mechanical design of an existing weighing hardware equipment of the weighing device;
program instructions to iteratively generate a set of parameters for the weighing device based on the one or more conditions of the environment of the weighing device, the reward value, and the state of the environment of the weighing device;
program instructions to the iterative generation of the set of parameters for each state associated with the environment of the weighing device, which includes considering a physical environment and attribute characteristics of a packaged product and setting an average give-away rate change as a reward and punishment function to provide timely feedback and timely adjustment of the set of parameters; and
program instructions to determine the reward for the state by dividing the reward value by a number of adjusted parameters based on positive and negative values, which are utilized to determine the average give-away rate.

16. The computer system according to claim 15, the stored program instructions further comprising:
program instructions to modify one or more parameters of the set of parameters for the weighing device based at least in part on the reward value for the state of the environment of the weighing device.

17. The computer system according to claim 16, the stored program instructions further comprising:
program instructions to collect iterative feedback data of the environment of the weighing device, wherein the feedback data relates to the environment of the weighing device;

program instructions to identify an optimal set of parameters for the weighing device based on the iterative feedback data, wherein the optimal set of parameters result in the average give-away rate of the weighing device meeting a target give-away rate, wherein the target give-away rate is based at least in part on a target weight of the product; and program instructions to modify the one or more parameters of the set of parameters for the weighing device based on the optimal set of parameters.

18. The computer system according to claim 16, wherein the reward value for the state of the environment of the weighing device is based at least in part on the average give-away rate of the state, an overall average give-away rate of the weighing device, and an amount of modified parameters for the state of the environment of the weighing device.

19. The computer system according to claim 15, the stored program instructions further comprising:

program instructions to generate an initial set of parameters for the weighing device;

program instructions to determine a weight of one or more products associated with the initial set of parameters;

program instructions to determine that a pass rate for the one or more products of the weighing device exceeds a threshold pass rate; and program instructions to determine an overall average give-away rate of the weighing device for the one or more products based at least in part on the weight of the one or more products.

20. The computer system according to claim 15, wherein program instructions to determine the one or more conditions of the environment of the weighing device, further comprise program instructions to:

collect a set of physical environment data from one or more sensors associated with the environment of the weighing device;

collect a set of product attribute data from the one or more sensors associated with the environment of the weighing device, wherein the set of product attribute data corresponds to physical attributes of the article of the product; and generate a set of conditions corresponding to the environment of the weighing device based at least in part on the set of physical environment data and the set of product attribute data.

* * * * *